United States Patent [19]

Matsuhisa et al.

[11] 4,295,892

[45] Oct. 20, 1981

[54] CORDIERITE CERAMIC HONEYCOMB AND A METHOD FOR PRODUCING THE SAME

[75] Inventors: Tadaaki Matsuhisa; Shigeo Soejima; Noboru Yamamoto, all of Nagoya, Japan

[73] Assignee: NGK Insulators, Ltd., Nagoya, Japan

[21] Appl. No.: 971,485

[22] Filed: Dec. 20, 1978

Related U.S. Application Data

[63] Continuation of Ser. No. 772,953, Feb. 28, 1977, abandoned, which is a continuation of Ser. No. 674,933, Apr. 8, 1976, abandoned.

[51] Int. Cl.$^3$ .............................................. C04B 35/18
[52] U.S. Cl. .................................. 501/120; 501/119; 501/153
[58] Field of Search ........................ 106/62, 73.4, 73.5

[56] References Cited

U.S. PATENT DOCUMENTS

| | | | |
|---|---|---|---|
| 2,036,190 | 4/1936 | Benner | 106/62 |
| 2,731,355 | 1/1956 | Skinner | 106/62 |
| 3,458,329 | 7/1969 | Owens | 106/73.5 |
| 3,499,787 | 3/1970 | Inoue | 106/39.6 X |
| 3,531,307 | 9/1970 | Rubin | 106/62 |
| 3,790,654 | 2/1974 | Bagley | 264/177 R |
| 3,824,196 | 7/1974 | Benbow et al. | 252/455 R |
| 3,885,977 | 5/1975 | Lachman et al. | 106/62 |
| 3,899,326 | 8/1975 | Frost | 264/67 |
| 3,919,384 | 11/1975 | Cantaloupe et al. | 264/177 R |
| 3,950,175 | 4/1976 | Lachman et al. | 106/62 |
| 3,954,672 | 5/1976 | Somers et al. | 106/62 |
| 3,958,058 | 5/1976 | Elmer | 106/40 R |
| 3,979,216 | 9/1976 | Fritsch et al. | 106/62 |
| 4,001,028 | 1/1977 | Frost et al. | 106/62 |
| 4,033,779 | 7/1977 | Winkler | 106/62 |
| 4,189,327 | 2/1980 | Winchester | 106/62 X |

FOREIGN PATENT DOCUMENTS

| | | | |
|---|---|---|---|
| 836059 | 6/1960 | United Kingdom | 106/62 |
| 425880 | 10/1974 | U.S.S.R. | 106/62 |

OTHER PUBLICATIONS

SVEC, J.J., "Corning Glass Produces Ceramic Substrates Efficiently", Ceramic Industry Magazine, Aug. 1975, pp. 16–18.

Searle, A. B., *Refractory Materials* (1950), pub. by Chas. Griffin & Co., London, 3rd Ed., pp. 147–150, 386–387 and 486.

*Primary Examiner*—Helen M. McCarthy
*Attorney, Agent, or Firm*—Stevens, Davis, Miller & Mosher

[57] ABSTRACT

Cordierite ceramic honeycomb consisting mainly of cordierite in crystal phase and containing not more than 20% by weight of at least one crystal selected from the group consisting of spinel, mullite and corundum and having a thermal expansion coefficient at a temperature range of 25°–1,000° C. being less than $22 \times 10^{-7}$ (1/°C.).

3 Claims, No Drawings

CORDIERITE CERAMIC HONEYCOMB AND A METHOD FOR PRODUCING THE SAME

This is a continuation of application Ser. No. 772,953 filed Feb. 28, 1977, now abandoned, which was a continuation of application Ser. No. 674,933, filed Apr. 8, 1976, now abandoned.

BACKGROUND OF THE INVENTION

1. Field of the Invention

The present invention relates to cordierite ceramic honeycomb, particularly cordierite ceramic honeycomb having a high thermal shock resistance, a high thermal resistance and an excellent catalyst adhering ability and a high catalytic property, and a method for producing the ceramic honeycomb.

The ceramic honeycomb means a thin-walled multicellular, that is, honeycombed structure composed of a ceramic material and the cross-section of the cell may be any geometrical pattern, such as, hexagonal, square, rectangular, triangular, and circular shape.

A mean pore size which is a property relating to the pores in the thin wall of the ceramic honeycomb, is defined as a pore diameter corresponding to 50% of the total pore volume in the pore size distribution according to mercury pressure porosimeter tests.

2. Description of the Prior Art

The ceramic honeycomb has been used as a catalyst substrate to be used for an apparatus for purifying hydrocarbons, carbon monoxide and nitrogen oxides in an automotive exhaust gas. The ceramic honeycomb catalyst substrate to be used for the apparatus for purifying the automotive exhaust gas requires several important properties. One of these properties is thermal shock resistance, which means that no crack or breakage is caused by thermal stress caused by a large temperature difference which occurs in the ceramic honeycomb subjected to the temperature change due to rapid heat generation in a catalytic oxidation reaction of unburned hydrocarbon and carbon monoxide in the exhaust gas. When a honeycomb is durable to rapid heating and quenching, through a temperature difference exceeding about 500° C., which is an indication of this thermal shock resistance, it has been known that there is no practical problem. The smaller the thermal expansion coefficient, the higher the temperature to which a material is durable to rapid heating and quenching, so that it has been known that the thermal expansion coefficient has the highest influence upon the thermal shock resistance among the properties of the ceramic honeycomb and the ceramic honeycomb having a low thermal expansion coefficient has been demanded. The other property required in the ceramic honeycomb catalyst substrate is thermal resistance, which is high temperature stability showing resistance against fusing damage upon misfire of an engine. When a raw gas caused by misfire of an engine is introduced into the honeycomb catalyst having a normal operating temperature of about 500° C. and a rapid oxidation exothermic reaction occurs in the catalyst, if the thermal resistance is low, the honeycomb is melted and the passage resistance of the exhaust gas becomes larger and the engine is subjected to a large load. However, automobiles provided with the catalytic purifying apparatus have been generally provided with a safety device, such as a secondary air controlling mechanism for controlling the misfire upon idling, driving under a high load, driving at a high speed and driving on a downward slope, so that unless the ceramic honeycomb to be used as the catalyst substrate is softened and shrunk at 1,450° C., there is no practical problem. Another property required for the ceramic honeycomb catalyst substrate is an adhering ability, which is the adhering and supporting ability upon coating an active material for catalyst and a catalytic component on the honeycomb catalyst substrate and an adhering and holding ability of the active material for catalyst and the catalytic component on the catalyst substrate by which the coatings are not exfoliated upon driving.

Heretofore, as the material for the ceramic honeycomb structure, use has been made of cordierite, mullite, alumina, zircon, lithia and so on, carbides and nitrides. Among them, cordierite, mullite, alumina and zircon have been used in view of the thermal resistance and antioxidation as the material for the ceramic honeycomb catalyst substrate for purifying engine exhaust gas.

The ceramic honeycomb made of mullite, alumina, zircon or a mixture thereof is better in the thermal resistance than the cordierite honeycomb and satisifies practically in the high temperature stability at about 1,450° C. but the thermal expansion coefficient is 3–5 times larger than that of the cordierite honeycomb, so that the thermal shock resistance is poor and when the temperature change due to a rapid catalytic oxidation exothermic reaction of unburned hydrocarbon and carbon monoxide in the exhaust gas is applied and a large temperature difference is caused in the honeycomb, cracks and breakage are caused in the honeycomb due to the thermal stress.

On the other hand, the cordierite ceramic honeycomb shows a low thermal expansion coefficient as disclosed in Irwin M. Lachman et al, U.S. Pat. No. 3,885,977 issued May 27, 1975 and entitled "Anisotropic Cordierite Monolith", so that the cordierite ceramic honeycomb is excellent in the thermal shock resistance but is lower in the melting point than the mullite honeycomb and alumina honeycomb and is suddenly softened or melted at a temperature of higher than about 1,400° C. and therefore when the temperature of the honeycomb is raised to about 1,450° C. by misfire of a engine, the honeycomb shape cannot be maintained.

The ceramic honeycombs produced by extrusion as disclosed, for example, in John Jones Benbow et al, U.S. Pat. No. 3,824,196 issued July 16, 1974 and entitled "Catalyst Support", Rodney D. Bagley, U.S. Pat. No. 3,790,654 issued Feb. 5, 1974 and entitled "Extrusion Method for Forming Thin-walled Honeycomb Structures" and U.S. Pat. No. 3,905,743 issued Sept. 16, 1975 and entitled "Extrusion Apparatus for Forming Thin-walled Honeycomb Structures", which is divided from Bagley, are dense in the texture by extrusion forming under a high pressure and the total pore volume becomes small and at the same time the mean pore size in the thin wall, particularly the surface of the thin wall becomes small, so that the adhering ability of the active material for catalyst and the catalytic component on the catalyst substrate becomes poor and the active material and the catalytic component are liable to be exfoliated during use. Moreover, in the production of the honeycomb through extrusion forming, when the plasticized batch is formed into a honeycomb and the formed honeycomb is dried and fired to form the ceramic honeycomb, if finely divided starting material is used as the starting material for the honeycomb or starting material containing crystal water or a salt, such as carbonate, sulfate, nitrate and the like is used, shrinkage is large in the drying and ring steps, so that cracks are liable to be caused in the drying and firing steps and the yield is poor.

The ceramic honeycomb catalyst substrate to be used in the apparatus for purifying exhaust gas of automobiles is very severe in the using condition and the ceramic honeycomb having a high thermal shock resistance, a high thermal resistance and an excellent adhering ability of the active material for catalyst and the catalytic component on the catalyst substrate has been strongly demanded.

SUMMARY OF THE INVENTION

The present invention is based on the discovery that the ceramic honeycomb consisting mainly of cordierite in crystal phase and further containing not more than 20% by weight of at least one crystal selected from the group consisting of spinel, mullite and corundum is higher in the softening temperature and melting temperature than the ceramic honeycomb consisting of cordierite alone and slow in gradient of softening shrinkage curve from the softening temperature to the melting temperature and the thermal resistance is improved, further that the ceramic honeycomb has substantially no difference in the thermal expansion coefficient from the ceramic honeycomb composed of cordierite alone, so that there is no practical problem in the thermal shock resistance. Furthermore, in the present invention, it has been found that by using a chemical composition of 42-52% by weight of silica, 34-48% by weight of alumina and 10-18% by weight of magnesia, preferably 44-51% by weight of silica, 35-45% by weight of alumina and 11-16% by weight of magnesia, a ceramic honeycomb consisting mainly of cordierite in the crystal phase and containing not more than 20% by weight, preferably 1-20% by weight, more preferably 2-15% by weight, of at least one crystal selected from the group consisting of spinel, mullite and corundum, and having a high thermal resistance and an excellent thermal shock resistance in which the thermal expansion coefficient is not more than $22\times10^{-7}$ (1/°C.), preferably not more than $16\times10^{-7}$ (1/°C.) can be obtained. Moreover, it has been found that when the mean pore size is 3-30 micron meter, the adhering ability of the active material for catalyst and the catalytic component on the honeycomb catalyst substrate is excellent. In addition, it has been found that the generation of cracks during the production steps of honeycomb can be prevented by adding preferably 90-10% by weight, more preferably adding 80-20% by weight of powder obtained by pulverizing a fired body having the same chemical composition and the same crystal phase as that of the final product of the ceramic honeycomb to the starting material.

Accordingly, a main object of the present invention is to provide cordierite ceramic honeycomb, in which the excellent thermal shock resistance of cordierite is maintained and the thermal resistance of a defect of cordierite is improved.

Another object of the present invention is to provide cordierite ceramic honeycomb having an excellent adhering ability for the active material for catalyst and the catalytic component on the catalyst substrate.

A further object of the invention is to provide a method for producing cordierite ceramic honeycomb which does not cause cracks upon the forming, drying and firing steps.

The cordierite ceramic honeycomb according to the present invention consists mainly of cordierite in the crystal phase and contains not more than 20% by weight, preferably 1-20% by weight, more preferably 2-15% by weight of at least one crystal selected from the group consisting of spinel, mullite and corundum and has a thermal expansion coefficient at a temperature range of 25°-1,000° C. being not more than $22\times10^{-7}$ (1/°C.), preferably not more than $16\times10^{-7}$ (1/°C.). Preferably, the cordierite ceramic honeycomb according to the present invention consists mainly of cordierite in the crystal phase and contains not more than 20% by weight, more preferably 1-20% by weight, more preferably 2-15% by weight of at least one crystal selected from the group consisting of spinel, mullite and corundum and has a thermal expansion coefficient at a temperature range of 25°-1,000° C. being not more than $22\times10^{-7}$ (1/°C.), preferably not more than $16\times10^{-7}$ (1/°C.) and a mean pore size of 3-30 micron meter.

The cordierite ceramic honeycomb is produced by preparing a batch consisting of talc, clay and at least one of aluminum hydroxide and alumina so selected that the batch has a chemical composition consisting of 42-52% by weight of silica, 34-48% by weight of alumina and 10-18% by weight of magnesia, preferably 44-51% by weight of silica, 35-45% by weight of alumina and 11-16% by weight of magnesia, plasticizing and forming the batch into a honeycombed shape and then drying and firing the formed honeycomb.

Furthermore, the cordierite ceramic honeycomb is produced by preparing a batch consisting of a mixture and cordierite powder, said mixture consisting of talc, clay and at least one of aluminum hydroxide and alumina so selected that the mixture has a chemical composition of 42-52% by weight of silica, 34-48% by weight of alumina and 10-18% by weight of magnesia, said cordierite powder having an average particle size of 10-100 micron meter and obtained by previously firing the above described mixture and pulverizing the fired mixture, and plasticizing and forming the batch into a honeycombed shape and then drying and firing the formed honeycomb. In this case the batch consists of preferably 10-90% by weight of said mixture and 90-10% by weight of said cordierite powder, more preferably 20-80% by weight of said mixture and 80-20% by weight of said cordierite powder.

Alternatively, the cordierite ceramic honeycomb is produced by preparing a batch consisting of not less than 80% by weight of a mixture and cordierite powder and not more than 20% by weight of a crystal, said mixture consisting of talc, clay and at least one of aluminum hydroxide and alumina so selected that the mixture has a chemical composition of 50-52% by weight of silica, 34-37% by weight of alumina and 13-15% by weight of magnesia, and said crystal being at least one crystal selected from the group consisting of spinel, mullite and alumina and having an average particle size of 20-60 micron meter, plasticizing and forming the batch into a honeycombed shape and then drying and firing the formed honeycomb.

Moreover, the cordierite ceramic honeycomb is produced by preparing a batch consisting of not less than 80% by weight of a compounded material consisting of a mixture and cordierite powder, and not more than 20% by weight of a crystal, said mixture consisting of talc, clay and at least one of aluminum hydroxide and alumina so selected that the mixture has a chemical composition of 50-52% by weight of silica, 34-37% by weight of alumina and 13–15% by weight of magnesia, said cordierite powder having an average particle size of 10–100 micron meter and obtained by previously firing the above described mixture and pulverizing the fired mixture, and said crystal being at least one crystal selected from the group consisting of spinel, mullite and alumina and having an average particle size of 20–60 micron meter, plasticizing and forming the batch into a honeycomb shape and then drying and firing the formed honeycomb. In this production, the compounding ratio of the above described mixture and the cordierite powder is preferably 10–90% by weight of said mixture and 90–10% by weight of the cordierite powder, more preferably 20–80% by weight of said mixture and 80–20% by weight of cordierite powder.

A part or total amount of talc and a part of clay may be substituted with calcined talc and calcined clay as the starting material, respectively.

DETAILED DESCRIPTION OF THE INVENTION

It should be particularly noticed in the present invention that by containing at least one crystal selected from the group consisting of spinel, mullite and corundum, the softening temperature which is a factor of the thermal resistance is not only increased, but also the gradient of the softening shrinkage curve from the softening temperature to the melting temperature becomes slow and the melting temperature becomes high and as the result, the softening shrinkage at 1,450° C. becomes less than 10% and the practically satisfactory thermal resistance as the ceramic honeycomb catalyst substrate to be used for the apparatus for purifying exhaust gas of automobile can be obtained.

The reason for the above described limitations in the present invention is as follows.

The reason why an amount of at least one crystal selected from the group consisting of spinel, mullite and corundum is limited to not more than 20% by weight, is based on the fact that when said amount exceeds 20% by weight, there is no problem in the thermal resistance of the cordierite ceramic honeycomb but the thermal expansion coefficient at a temperature range of 25°–1,000° C. exceeds $22 \times 10^{-7}$ (1/°C.), so that such a ceramic honeycomb cannot practically endure the thermal shock.

The reason why the thermal expansion coefficient at a temperature range of 25°–1,000° C. is limited to less than $22 \times 10^{-7}$ (1/°C.), is based on the fact that when said thermal expansion coefficient exceeds $22 \times 10^{-7}$ (1/°C.), the temperature difference through which such materials are durable to rapid heating and quenching does not reach 500° C. and when such a cordierite ceramic honeycomb is used as the catalyst substrate of the apparatus for purifying the exhaust gas for a long time of period, cracks or breakage are caused and such a honeycomb cannot practically endure.

The reason why the mean pore size of the cordierite ceramic honeycomb is limited to 3–30 micron meter is based on the fact that when the mean pore size is less than 3 micron meter, the adhering ability of the active material for catalyst and the catalytic component on the ceramic honeycomb catalyst substrate is poor and when such a ceramic honeycomb is used as the apparatus for purifying the exhaust gas, the supported active material and catalytic component are liable to be exfoliated by mechanical vibration and thermal shock and the adhering ability lowers. When the mean pore size exceeds 30 micron meter, the mechanical strength of the cordierite ceramic honeycomb structure lowers and the specific surface area of the pore surface considerably lowers and the catalytic activity also lowers.

The reason why the chemical composition range is limited to 42–52% by weight of silica, 34–48% by weight of alumina and 10–18% by weight of magnesia is based on the fact that as mentioned above, when the chemical composition is within such a range, the thermal expansion coefficient in a temperature range of 25°–1,000° C. is less than $22 \times 10^{-7}$ (1/°C.) and the temperature difference through which such materials are durable to rapid heating and quenching of an indication of the thermal shock resistance is higher than 500° C. and when such a ceramic honeycomb is used as the catalyst substrate for the apparatus for purifying the exhaust gas for a long period of time, cracks or breakage are not caused and the thermal resistance is excellent. When the silica amount exceeds 52% by weight or the alumina amount is less than 34% by weight or the magnesia amount exceeds 18% by weight, the thermal resistance cannot be improved and the object of the present invention cannot be attained. On the other hand, when the silica amount is less than 42% by weight or the alumina amount exceeds 48% by weight, or the magnesia amount is less than 10% by weight, the thermal expansion coefficient exceeds $22 \times 10^{-7}$ (1/°C.) and the thermal shock resistance is poor.

The reason why the preferable chemical composition range is limited to 44–51% by weight of silica, 35–45% by weight of alumina and 11–16% by weight of magnesia, is based on the fact that as mentioned above, this composition range can provide such a crystal phase that the main component consists of cordierite and not more than 20% by weight of at least one crystal of spinel, mullite and corundum which can improve the thermal resistance, and the thermal expansion coefficient of such a ceramic honeycomb is not substantially different from that of the ceramic honeycomb composed of a cordierite alone and an excellent thermal shock resistance can be obtained.

The reason why 10–90% by weight of a mixture of talc, aluminum hydroxide and/or alumina and clay, said mixture beig compounded to have such a chemical composition that silica is 42–52% by weight, alumina is 34–48% by weight and magnesia is 10–18% by weight, is mixed with 90–10% by weight of cordierite powder obtained by previously firing the above described mixture and then pulverizing said fired mixture, is based on the fact that when the mixture of talc, aluminum hydroxide and/or alumina and clay is less than 10% by weight or said cordierite powder exceeds 90% by weight, the resulting green body obtained by the mixing is insufficient in plasticity and formability, and when the green body is extruded into a honeycomb, it becomes poor. On the other hand, when the mixture of talc, aluminum hydroxide and/or alumina, and clay exceeds 90% by weight or said cordierite powder is less than 10% by weight, the formed honeycomb obtained by extruding the resulting green body is large in shrinkage upon drying and firing and cracks are readily formed upon the drying and firing steps and particularly when a large size of honeycomb is integrally produced, the yield becomes poor and further the mean pore size in the fired honeycomb becomes less than 3 micron meter.

The reason for limitation of the particle size of cordierite powders to 10–100 micron meter is based on the fact that when the particle size is less than 10 micron meter, the mean pore size of the fired honeycomb is less than 3 micron meter and shrinkage in the drying and firing steps in the production of the honeycomb becomes large and the effect for adding said powder to the starting material lowers. When said particle size exceeds 100 micron meter, the mean pore size exceeds 30 micron meter and the mechanical strength of the cordierite ceramic honeycomb lowers and the specific surface area of the pore surface lowers and the catalytic activity lowers.

The reason why the chemical composition range is limited to 50–52% by weight of silica, 34–37% by weight of alumina and 13–15% by weight of magnesia in the alternative production method of the present invention is based on the fact that this composition range can provide the optimum range of the composition in which the cordierite crystal is the main component.

The reason why an amount of at least one crystal selected from the group consisting of spinel, mullite and alumina is limited to not more than 20% by weight is based on the fact that when such an amount exceeds 20% by weight, the thermal expansion coefficient at a temperature range of 25°–1,000° C. of the fired cordierite ceramic honeycomb becomes large and the thermal shock resistance is not practically satisfied.

The reason why the average particle size of spinel, mullite or alumina is limited to 20–60 micron meter is based on the fact that when said average particle size is less than 20 micron meter, this spinel, mullite and/or alumina are apt to react with melted cordierite matrix in the firing step and the effect which is maintaining the high temperature rigidity of the honeycomb as the thermal resistant starting material is reduced, while when said average particle size exceeds 60 micron meter, the surface area of spinel, mullite or alumina becomes small and the contact surface area with the cordierite as the matrix component becomes less and the effect for improving the thermal resistance lowers.

The invention will be further explained in detail in the following examples which are not intended as limitations thereof.

EXAMPLE

Talc, aluminum hydroxide and alumina and clay, if necessary calcined talc and/or calcined clay were compounded as shown in Table 1 to obtain the chemical composition described in the Table 1 and mixed, kneaded and then dried. The dried product was fired at 1,375° C. for 5 hours and then pulverized to obtain the average particle size as shown in Table 1, to prepare cordierite powder.

In Examples 2–6 and References 1–3, said cordierite powder and the above described starting mixture were mixed in the compounding ratio as shown in Table 1. In Examples 8 and 9 and Reference 4, the above described cordierite powder and the above described starting mixture and further spinel, alumina or mullite having the average particle size as shown in Table 1 were mixed and to 100 parts by weight of this mixture were added 5 parts by weight of water and 20 parts by weight of starch (a paper adhesive containing about 80% by weight of water, available under the Trade Name "Fueki-Nori" in Japan) and the resulting mixture was thoroughly kneaded with a kneader and the resulting green body was extruded into a honeycombed shape with a vacuum extruder. The formed body was dried and then fired at 1,400° C. for 3 hours to obtain cordierite ceramic honeycombs of Examples 1–9 and References 1–4.

Amounts of spinel, mullite and corundum were determined by powder X-ray diffraction and the thermal expansion coefficient at a temperature range of 25°–1,000° C., the temperature difference through which such materials are durable to rapid heating and quenching, the softening shrinkage percent when keeping at 1,450° C. for 15 minutes and the melting temperature were determined with respect to the various cordierite ceramic honeycombs shown in Table 1. The obtained results are shown in Table 1. As seen from the results in Table 1, the ceramic honeycombs consisting mainly of cordierite in the crystal phase and containing not more than 20% by weight of at least one crystal selected from spinel, mullite and corundum are less than 10% in the softening shrinkage percent when keeping at a temperature of 1,450° C. for 15 minutes and the melting temperature is 1,460° C. or higher, so that such ceramic honeycombs have practically satisfactory thermal resistance and less than $22 \times 10^{-7}$ (1/°C.) in the thermal expansion coefficient at a temperature range of 25°–1,000° C., and the temperature difference through which it is durable to rapid heating and quenching is higher than 500° C., so that the thermal shock resistance is practically satisfied. Furthermore, since cordierite powder having an average particle size of 10–100 micron meter was compounded as a batch composition, the mean pore size is 3–30 micron meter and the adhering ability of the active material for catalyst and the catalytic component on the honeycomb catalyst substrate was also excellent.

As mentioned above, since cordierite honeycomb according to the present invention consists mainly of cordierite in the crystal phase and contains not more than 20% by weight of at least one crystal of spinel, mullite and corundum, both the thermal shock resistance and the thermal resistance are excellent and said cordierite ceramic honeycomb has the mean pore size of 3–30 micron meter, so that the adhering ability of the catalyst is also excellent. Accordingly, the cordierite ceramic honeycomb according to the present invention can be broadly used for various industrial catalyst substrates, regenerators, radiators and heat exchangers as well as the catalyst substrate for purifying exhaust gas and are very commercially useful.

TABLE 1

|  | Present Invention | | | | | | | | | References | | | |
|---|---|---|---|---|---|---|---|---|---|---|---|---|---|
|  | 1 | 2 | 3 | 4 | 5 | 6 | 7 | 8 | 9 | 1* | 2** | 3*** | 4**** |
| Chemical composition of starting material (wt. %) | | | | | | | | | | | | | |
| $SiO_2$ | 49.0 | 50.0 | 48.0 | 50.0 | 43.0 | 48.0 | 51.0 | 51.0 | 51.0 | 51.3 | 45.0 | 48.0 | 51.0 |
| $Al_2O_3$ | 37.0 | 36.0 | 37.5 | 37.0 | 41.0 | 41.0 | 35.0 | 35.0 | 35.0 | 34.9 | 46.0 | 37.5 | 35.0 |
| MgO | 14.0 | 14.0 | 14.5 | 13.0 | 16.0 | 11.0 | 14.0 | 14.0 | 14.0 | 13.8 | 9.0 | 14.5 | 14.0 |
| Compounding ratio of starting material | | | | | | | | | | | | | |

TABLE 1-continued

|  | Present Invention | | | | | | | | | References | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1* | 2** | 3*** | 4**** |
| (wt. %) | | | | | | | | | | | | | |
| Talc | 38 | 38 | 39 | 34 | 20 | 30 | 39 | 39 | 39 | 37 | 28 | 39 | 39 |
| Calcined talc | — | — | — | — | 20 | — | — | — | — | — | — | — | — |
| Aluminum hydroxide | 10 | 23 | 20 | 21 | 30 | 32 | 10 | 10 | 10 | 17 | — | 20 | 10 |
| Alumina | 12 | — | 6 | — | 8 | — | 7 | 7 | 7 | — | 22 | 6 | 7 |
| Clay | 12 | 15 | 35 | 25 | 22 | 38 | 44 | 44 | 44 | 46 | 60 | 35 | 44 |
| Calcined clay | 28 | 24 | — | 20 | — | — | — | — | — | — | — | — | — |
| Cordierite powder (μ) Average particle size | — | 30 | 25 | 50 | 10 | 80 | — | 40 | 50 | 25 | 30 | 7 | 40 |
| Spinel, mullite, alumina Kind | — | — | — | — | — | — | Alumina | Mullite | Spinel | — | — | — | Mullite |
| Average particle size (μ) | — | — | — | — | — | — | 40 | 30 | 50 | — | — | — | 5 |
| Compounding ratio of batch (wt. %) | | | | | | | | | | | | | |
| Starting material | 100 | 80 | 70 | 50 | 80 | 30 | 85 | 40 | 50 | 70 | 30 | 70 | 50 |
| Cordierite powder | — | 20 | 30 | 50 | 20 | 70 | 0 | 50 | 30 | 30 | 70 | 30 | 38 |
| Spinel, mullite, alumina | — | — | — | — | — | — | 15 | 10 | 20 | — | — | — | 12 |
| Properties of cordierite ceramic honeycomb | | | | | | | | | | | | | |
| Spinel amount (wt. %) | 3 | 2 | 6 | 1 | 16 | — | — | — | 15 | — | — | 3 | — |
| Mullite amount (wt. %) | 2 | 1 | 2 | 2 | — | 15 | 3 | 7 | 3 | — | 20 | — | 6 |
| Corundum amount (wt. %) | — | — | — | — | — | 3 | 12 | 2 | — | — | 5 | — | 3 |
| Thermal expansion coefficient $\times 10^{-7}$ (1/°C.) (at 25–1,000° C.) | 12 | 7 | 12 | 12 | 16 | 18 | 16 | 15 | 20 | 11 | 25 | 14 | 16 |
| Temperature difference durable to rapid heating and quenching (°C.) | 800 | 900 | 800 | 750 | 650 | 600 | 650 | 700 | 550 | 800 | 450 | 650 | 650 |
| Softening shrinkage (%) (1,450° C. × 15 min.) | 2.0 | 3.0 | 0.5 | 5.2 | 0.1 | 0.2 | 0.0 | 0.2 | 0.1 | melted | 0.0 | 8.5 | melted |
| Melting temperature (°C.) | 1,470 | 1,465 | 1,480 | 1,460 | 1,520 | 1,485 | 1,550 | 1,490 | 1,520 | 1,440 | 1,570 | 1,460 | 1,450 |
| Mean pore size (μ) | — | — | — | 9 | 5 | 20 | 7 | 5 | 15 | — | — | 2 | 4 |

*Since spinel, mullite or corundum is not contained other than cordierite as the crystal component, the melting temperature is 1,440° C. and the thermal resistance is not practically satisfied.
**The total amount of mullite and corundum is 25% by weight, so that the thermal expansion coefficient at 25–1,000° C. exceeds $22 \times 10^{-7}$ (1/°C.) and the thermal shock resistance is not satisfied.
***The average particle size of cordierite powder is 7 micron meter, so that the mean pore size is 2 micron meter and the adhering ability of the active material and the catalytic component is poor.
****The average particle size of mullite is 5 micron meter, so that the effect for improving the thermal resistance is not obtained and the melting temperature is 1,450° C. which is practically satisfied.
*****4.66 inch-dia × 3.0 inch-long honeycomb.

What is claimed is:

1. Cordierite ceramic honeycomb having a softening shrinkage at 1,450° C. of not more than 0.5% which consists mainly of cordierite in crystal phase and contains 8 to 20% by weight of at least one crystal selected from the group consisting of spinel, mullite and corundum has a thermal expansion coefficient at a temperature range of 25°–1,000° C. being not more than $22 \times 10^{-7}$ (1/°C.).

2. Cordierite ceramic honeycomb having a softening shrinkage at 1,450° C. of not more than 0.5% and having a melting temperature of not less than than 1,480° C., which consists mainly of cordierite in crystal phase and contains 8–20% by weight of at least one crystal selected from the group consisting of spinel, mullite and corundum, made from starting materials which chemically consisted of 43–51% by weight silica, 35–41% by weight alumina and 11–16%, by weight magnesia, and has a thermal expansion coefficient at a temperature range of 25°–1,000° C. of not more than $20 \times 10^{-7}$ (1/°C.).

3. The cordierite ceramic honeycomb of claim 2, having a mean pore size in the range of 3–30 micron meters.